United States Patent
Weinhold

(10) Patent No.: US 8,616,588 B2
(45) Date of Patent: Dec. 31, 2013

(54) PIPE COUPLING FOR CONNECTING TWO PIPE ENDS

(76) Inventor: Karl Weinhold, Neuss (DE)

( * ) Notice: Subject to any disclaimer, the term of this patent is extended or adjusted under 35 U.S.C. 154(b) by 0 days.

(21) Appl. No.: 13/581,402

(22) PCT Filed: Feb. 18, 2011

(86) PCT No.: PCT/EP2011/052423
§ 371 (c)(1),
(2), (4) Date: Aug. 27, 2012

(87) PCT Pub. No.: WO2011/104184
PCT Pub. Date: Sep. 1, 2011

(65) Prior Publication Data
US 2012/0326440 A1 Dec. 27, 2012

(30) Foreign Application Priority Data
Feb. 25, 2010 (DE) .......................... 10 2010 009 360

(51) Int. Cl.
*F16L 23/00* (2006.01)
(52) U.S. Cl.
USPC .......................................... 285/365; 285/409
(58) Field of Classification Search
USPC .................. 285/364, 365, 409, 112
See application file for complete search history.

(56) References Cited

U.S. PATENT DOCUMENTS

| | | | | |
|---|---|---|---|---|
| 2,689,141 A | * | 9/1954 | Kiekhaefer | 285/409 |
| 3,042,430 A | * | 7/1962 | Guy | 285/365 |
| 3,346,275 A | * | 10/1967 | Des Jardins | 285/365 |
| 3,625,549 A | * | 12/1971 | De Vries | 285/373 |
| 3,964,774 A | * | 6/1976 | Wollin et al. | 285/409 |
| 4,407,533 A | * | 10/1983 | Giebeler | 285/365 |
| 4,460,201 A | * | 7/1984 | McGugan | 285/365 |
| 4,463,972 A | * | 8/1984 | Weinhold | 285/364 |
| 4,547,003 A | * | 10/1985 | McGugan | 285/407 |
| 4,640,530 A | * | 2/1987 | Abbes et al. | 285/365 |
| 4,660,869 A | * | 4/1987 | Gabus | 285/365 |
| 4,695,079 A | * | 9/1987 | Weinhold | 285/278 |
| 4,817,994 A | * | 4/1989 | Bronnert | 285/365 |
| 5,076,617 A | * | 12/1991 | Bronnert | 285/367 |
| 5,904,382 A | * | 5/1999 | Bronnert | 285/365 |
| 6,439,619 B1 | * | 8/2002 | Storage et al. | 285/365 |
| 6,672,631 B1 | * | 1/2004 | Weinhold | 285/410 |

(Continued)

FOREIGN PATENT DOCUMENTS

DE 2147924 A1 3/1973
DE 2746986 A1 4/1979

(Continued)

*Primary Examiner* — David E Bochna
(74) *Attorney, Agent, or Firm* — Berenato & White, LLC

(57) ABSTRACT

A pipe coupling for connecting two pipe ends having two coupling parts which are partially mated. At least one annular groove having an inserted seal is in the contact region on the outer side of the male part and/or the inner side of the female part. The male part includes an outer ring land and the female part includes a shoulder enclosed by a coupling clip in a form-fit manner when the pipe coupling is closed. In order to design and refine the pipe coupling so that it is possible to provide a pipe having a coupling clip in combination for simplifying the operational procedure, an annular groove is provided on the outer side of the female part into which a guide tab disposed on the inner side of the coupling clip is inserted when the pipe coupling is closed.

19 Claims, 4 Drawing Sheets

(56) References Cited

U.S. PATENT DOCUMENTS

Figure 1:
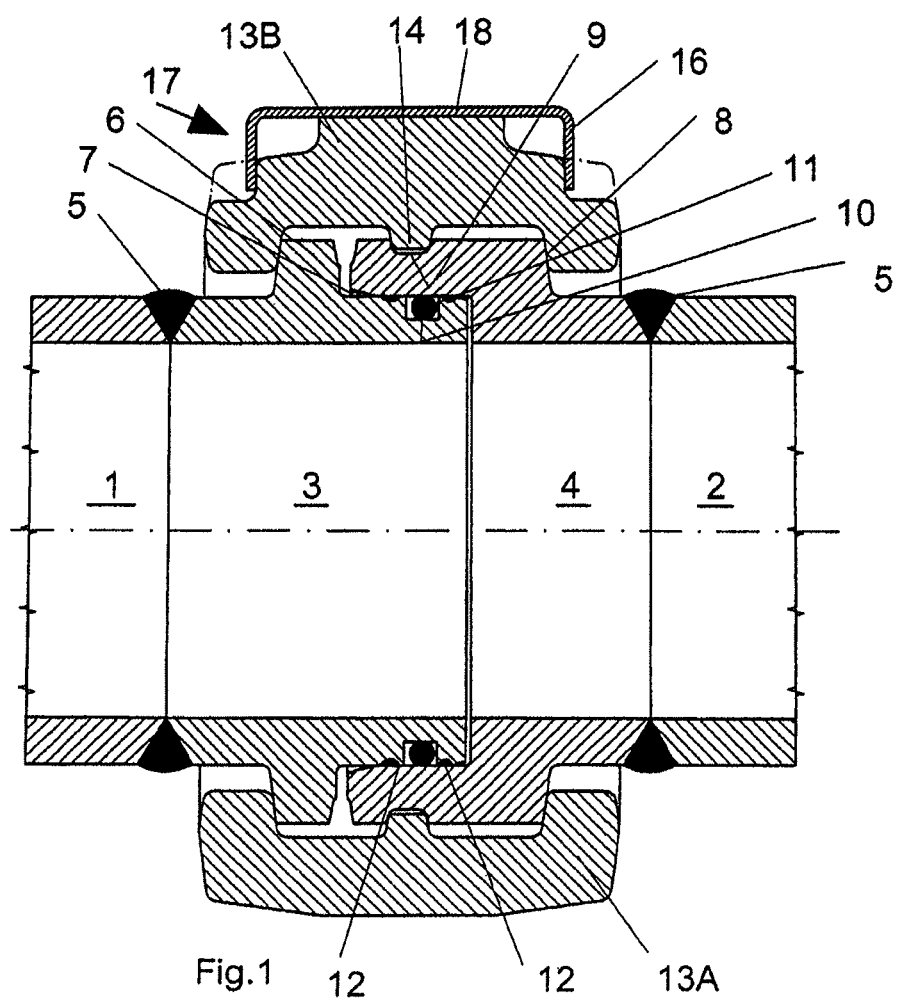

| | | | |
|---|---|---|---|
| 7,434,851 B2 * | 10/2008 | Weinhold | 285/409 |
| 7,591,489 B2 * | 9/2009 | Woo | 285/365 |
| 7,828,338 B2 * | 11/2010 | Kertesz et al. | 285/365 |

FOREIGN PATENT DOCUMENTS

| | | |
|---|---|---|
| DE | 4105206 C1 | 8/1992 |
| DE | 19837296 A1 | 3/2000 |
| WO | 2010/000563 A1 | 1/2010 |

* cited by examiner

PIPE COUPLING FOR CONNECTING TWO PIPE ENDS

CROSS-REFERENCE TO RELATED APPLICATIONS AND CLAIM TO PRIORITY

This application is a National Phase of International Application No. PCT/EP2011/052423 filed Feb. 18, 2011 and relates to German Patent Application No. 102010009360.2 filed Feb. 25, 2010, of which the disclosures are incorporated herein by reference and to which priority is claimed.

BACKGROUND OF THE INVENTION

The invention relates to a pipe coupling for connecting two pipe ends having two coupling parts implemented as a male part and a female part which are partially mated, at least one annular groove having an inserted seal being provided in the contact region on the outer side of the male part and/or the inner side of the female part, and the male part comprising an outer annular tab and the female part comprising a shoulder enclosed by a coupling clip in a form-fit manner when the pipe coupling is closed.

Such pipe couplings have been known for a long time and are used to releaseably fasten individual pipes in order to create pipeline systems (DE 41 05 206 C2). Here the axial connection is not made by means of a screw joint, but in a form- and force-fit manner by means of coupling clips also known in their own right. These coupling clips can be released quickly and so enable simple fitting and removal of pipeline systems equipped with such pipe couplings.

Since the known coupling clips always require both pipe ends in order to achieve a secure fit, the pipes and coupling clips must be marketed and transported separately. It is theoretically conceivable to apply a coupling clip to just one pipe end, but only with axial play, and so damage can occur during transport.

BRIEF SUMMARY OF THE INVENTION

Therefore, the object underlying the invention is to design and refine the pipe coupling specified at the start and described in more detail above so that it is possible to supply a pipe respectively having a coupling clip in a combination for simplifying the operational procedure. In this way there is always the required number of coupling clips for the available pipes, and no coupling clips supplied loosely are lost as can quickly happen, for example, when used underground. Moreover, a particularly small and inexpensive pipe coupling is desired.

The object is achieved with a pipe coupling according to the preamble of claim 1 in that there is provided on the outer side of the male part an annular groove into which a guide tab disposed on the inner side of the coupling clip is inserted when the pipe coupling is closed. By means of this configuration there is already a form- and force-fit connection when the coupling clip is only placed on the female part of a pipe and is closed here—without an inserted male part.

In a further embodiment of the invention provision is made such that the guide tab is positioned centrally in the coupling clip. In this way any orientation of the coupling clip relative to the pipe ends is achieved. It is preferred here if the guide tab is in the form of a circumferential tab, but it is also conceivable to form the guide tab only in sections if the sections are sufficiently large and arranged in order to be able to perform the required guiding function.

It is particularly advantageous if the sealing edge of the annular groove for the seal is disposed in the axial direction in the centre of the annular groove in the closed state of the pipe coupling. This configuration is the preferred solution with regard to stability and tightness.

Further teaching of the invention makes provision such that the corresponding flanks of the annular groove and the guide tab are conical in form. In this way it is achieved that the contact only takes place at the flanks, and that there always remains a gap between the annular groove and the guide tab so as to prevent any unwanted axial forces from being introduced and to always enable reliable centring.

According to a further embodiment of the invention, the contact surfaces of the annular tab and the shoulder and the inner contact surfaces of the coupling clip are also in the form of conical flanks. Here too the conicity ensures that when the coupling clip wears, the two free pipe ends move axially towards one another, and in this way a secure connection is guaranteed.

Further teaching of the invention makes provision such that the conicity of the inner contact surfaces of the coupling clip and of the corresponding flanks of the annular groove and the guide tab is different. In this way tilting of the individual parts when the pipe coupling is released is reliably ruled out.

According to a further advantageous embodiment of the invention the minimum immersion depth of the guide tab is ⅙ of the height of the inner contact surfaces of the coupling clip and the contact surfaces of the annular groove and the shoulder (main pressure area). In this way the main pressure area is not affected by the contact of the guide tab.

A particularly small pipe coupling is achieved in a further advantageous embodiment of the invention in that the male part and the female part are respectively welded on to the pipe ends by means of V-shaped seam. In this way the pipe coupling according to the invention can be very small because the coupling clip surrounding the pipe ends only needs to be slightly larger than the external pipe diameter.

A further embodiment of the invention makes provision such that at least one lubrication channel is disposed next to the annular groove provided for the seal, a lubrication channel preferably being provided on both sides of the annular groove respectively. In this way contamination of the annular groove or the seal located within the latter can largely be avoided.

Further teaching of the invention makes provision such that a multi-shell, preferably two-shell clip with a clamping lever is provided as the coupling clip. This configuration is particular advantageous because it guarantees particularly fast release and closure of the coupling clip. For this reason such coupling clips are also called fast clamping clips.

In a further preferred embodiment of the invention both shells are identical in design here, the clamping lever only being positioned at one shell end. Preferably, the coupling clips can have recesses for partially accommodating the clamping lever in order to minimise the size of the pipe coupling according to the invention and in order to reliably rule out unintentional opening of a projecting clamping lever.

Another embodiment of the invention makes provision such that the coupling clip has a support for the clamping lever. This is particularly advantageous for opening the closed coupling clip because a free space is created at the end of the support in which the clamping lever can be raised by means of an appropriate tool.

A further exemplary embodiment of the invention relates to the same pipe coupling, the coupling clip having been modified such that it has a threaded hole for accommodating a suspension eye into which the suspension eye is screwed and at its end has a taper the size of which is matched to the width of the annular groove and which projects as far into the inside of the coupling clip as the guide tab which in this region has been removed via the previously made bore hole. In this way a defined force closure takes place between the suspension eye and the pipe coupling. Since the pipe coupling according to the invention does not require any specific orientation between the mated pipe ends and the coupling clip, the coupling clip can always be arranged such that the suspension eye extends on its upper side.

This embodiment is particularly advantageous because pipeline systems with the pipe couplings equipped according to the invention, for example in underground mining, can easily be fastened, abutting, on their suspension eyes at an appropriate point or at the top by means of chains or the like.

Finally, a preferred embodiment of the invention makes provision such that the male part, the female part and the two clips can be produced by drop-forging (drop-forming), by means of which the pipe coupling according to the invention is relatively inexpensive to produce.

BRIEF DESCRIPTION OF THE SEVERAL VIEWS OF THE DRAWING(S)

Figure 2:
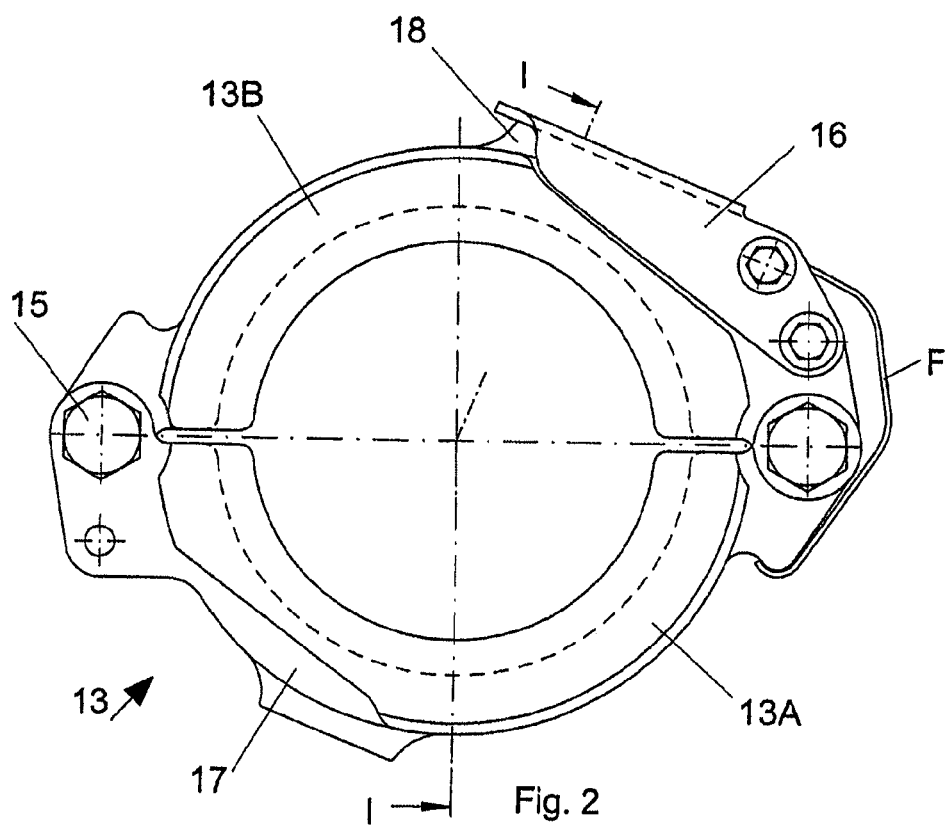
Figure 3:
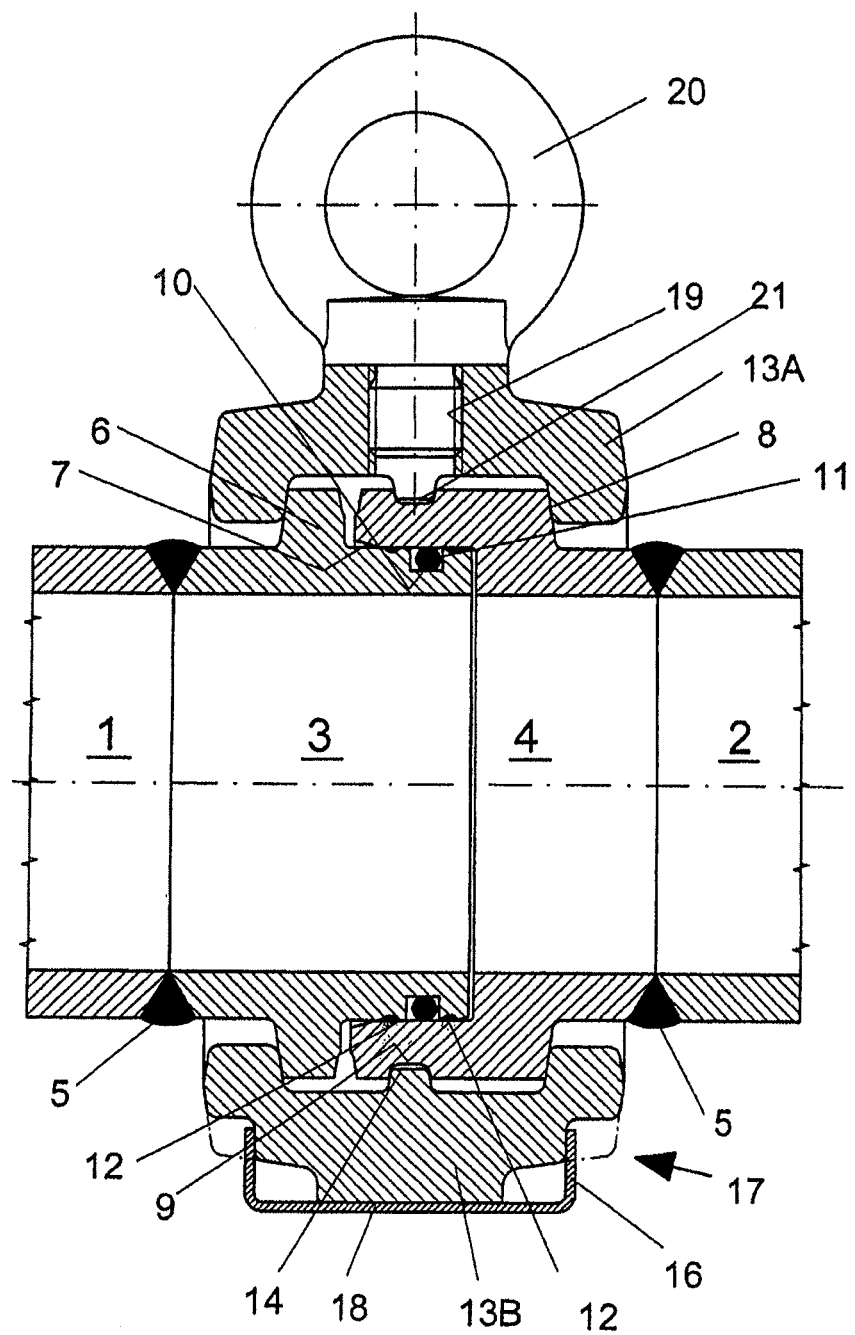
Figure 4:
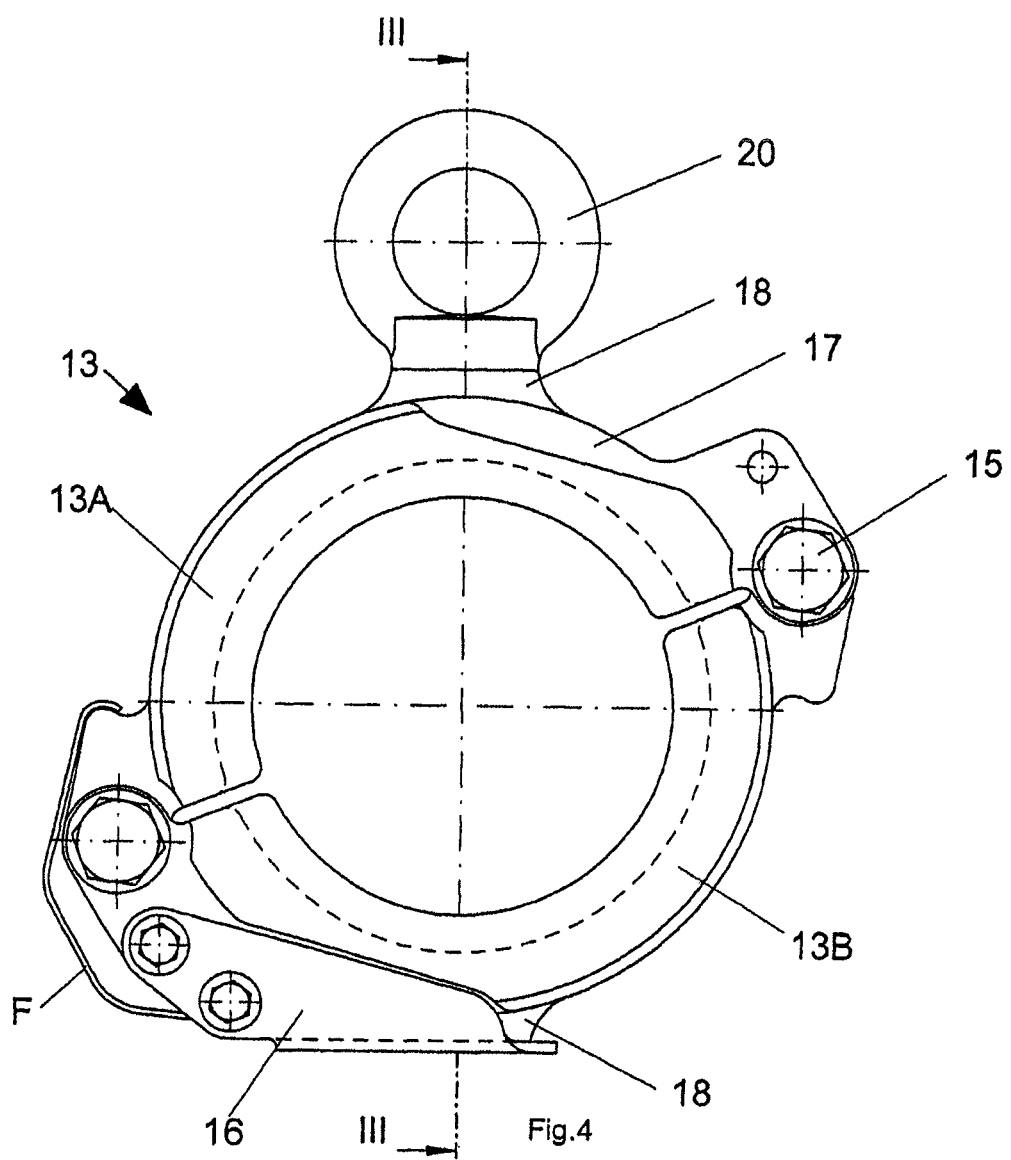

In the following the invention is explained in more detail using drawings only illustrating preferred exemplary embodiments. The drawings show as follows:

FIG. 1 a vertical section through a pipe coupling according to the invention along line I-I in FIG. 2, FIG. 2 a side view of a coupling clip for use with the pipe coupling according to the invention, FIG. 3 a vertical section of a further exemplary embodiment of a pipe coupling according to the invention along line III-III in FIG. 4, and FIG. 4 a further exemplary embodiment of a coupling clip for use with the pipe coupling according to the invention.

DETAILED DESCRIPTION OF EXEMPLARY EMBODIMENTS

In order to explain the invention two exemplary embodiments are shown, the first of which is shown in FIGS. 1 and 2, and the second in FIGS. 3 and 4. Here the altered embodiment only relates to the coupling clip used, as will be described below.

FIG. 1 shows two pipe ends 1 and 2 which are connected with a male part 3 and a female part 4 by means of V-shaped welded seams 5. The male part 3 has a circumferential annular tab 6. At its end the female part 4 is provided on the inside with a bevel 7 in order to facilitate the introduction of the male part 3. Moreover, in front of its widening for accommodating the male part 3 it has a shoulder 8.

According to the invention there is provided on the outer side of the female part 4 an annular groove 9 the position of which in the exemplary embodiment shown, and in this respect preferred, is located approximately centrally over the projection of the inserted male part 3.

A seal 11 inserted into a circumferential groove 10, which is preferably in the form of an O-ring, provides the seal between the male part 3 and the female part 4. The sealing edge of the annular groove 10 for the seal 11 is disposed here within the centre of the annular groove 9. Lubrication channels 12 next to the annular groove 10 protect the latter and the seal 11 located within the latter from contamination.

The mated pipe ends 1 and 2 are held axially by means of a coupling clip 13, the structure of which can be seen particularly well in FIG. 2. In the exemplary embodiment shown, and in this respect preferred, it consists essentially of two shells 13A and 13B which are respectively provided on their inside with a guide tab 14 extending over the whole internal length, the dimensions of which correspond to those of the annular groove 9. The two shells 13A and 13B are held together by an axis 15 (stud bolt). A clamping lever 16 snaps into place the closed coupling shells 13A and 13B by overcoming the force of a yoke spring F, as can be seen from FIG. 2.

This closed position is shown in FIG. 1, and one can clearly see that the guide tabs 14 engage in the annular groove 9 and so bring about axial fixing of the coupling clip 13 on the female part 4 of the pipe coupling according to the invention. The minimum immersion depth of the guide tabs 14 here is at least ⅙ of the height of the inner contact surfaces of the coupling clip 13 and the contact surfaces of the annular tab 6 and the shoulder 8 (main pressure area). Here the side contact surfaces are formed conically between the annular groove 9 and the guide tabs 14 so that an air gap remains between the bottom of the annular groove 9 and the respective guide tab 14. The conicity is greater here than with the contact surfaces of the annular tab 6 and the shoulder 8 which are also in the form of conical flanks in order to initially encompass the two coupling parts in a form-fit manner when the coupling clip 13 is closed, and finally hold them together axially in a force-fit manner.

It is particularly advantageous that by means of the embodiment of the pipe coupling according to the invention secure fixing of the coupling clip 13 on the female part 4 is also possible without the second pipe end 1 provided with the male part 3. In this way it is possible to supply individual pipes with coupling clips 13 "flanged on" together, and this eliminates damage of pipe ends or the clip and is associated with practical and logistical advantages.

Furthermore, it emerges from FIG. 2 that the coupling shells 13A and 13B, which are identical in design in the exemplary embodiment shown and in this respect preferred, are provided with a recess 17 for accommodating the side arms of the clamping lever 16 and a support 18 on which the clamping lever 16 lies in the closed state. Since the clamping lever 16 projects at its free end over the support 18, easy release of the clamping lever 16 is guaranteed at all times by lifting with an appropriate tool.

In the exemplary embodiment shown in FIGS. 3 and 4, in the region of a support 18 the coupling clip 13 is provided with a threaded hole 19 into which a suspension eye 20 can be screwed, as emerges clearly from FIG. 3. Here the length of the threaded pin of the suspension eye 20—shown rotated about 90° in FIG. 3—is chosen such that the tapered end 21, which has a diameter which corresponds to that of the guide tab 14, can engage instead of the guide tab 14 into the annular groove 9, as can also be seen well in FIG. 3 In this way it is possible to achieve a force closure between the suspension eye 20 and the coupling. This is particularly advantageous for applications in which the pipes equipped with pipe couplings according to the invention have to be suspended. Here the suspension takes place at the reinforced points of the pipeline system, namely the pipe couplings. As can be seen from FIG. 4, the suspension eye 20 is located opposite the closed clamping lever 16 so that the latter always remains freely operable.

The invention claimed is:

1. A pipe coupling for connecting two pipe ends (1, 2) comprising two coupling parts implemented as a male part (3) and a female part (4) which are partially mated, at least one annular groove (10) having an inserted seal (11) being provided in the contact region on the outer side of the male part (3) and/or the inner side of the female part (4), and the male part (3) comprising an outer annular tab (6) and the female part (4) comprising a shoulder (7) enclosed by a coupling clip

(13) in a form-fit manner when the pipe coupling is closed, wherein there is provided on the outer side of the female part (4) an annular groove (9) into which a guide tab (14) disposed on the inner side of the coupling clip (13) is inserted when the pipe coupling is closed, wherein the guide tab (14) is positioned centrally in the coupling clip (13).

2. The pipe coupling according to claim 1, wherein the guide tab (14) is in the form of a substantially circumferential tab.

3. The pipe coupling according to claim 2, wherein the coupling clip (13) is provided with a clamping lever.

4. The pipe coupling according to claim 3, wherein the coupling clip (13) has a support (18) for the clamping lever (16).

5. The pipe coupling according to claim 4, wherein the coupling clip (13) has a threaded hole (19) for accommodating a suspension eye (20).

6. The pipe coupling according to claim 3, wherein the coupling clip (13) has a threaded hole (19) for accommodating a suspension eye (20).

7. The pipe coupling according to claim 2, wherein the coupling clip (13) has a threaded hole (19) for accommodating a suspension eye (20).

8. The pipe coupling according to claim 1, wherein the coupling clip (13) is provided with a clamping lever.

9. The pipe coupling according to claim 8, wherein the coupling clip (13) has a support (18) for the clamping lever (16).

10. The pipe coupling according to claim 9, wherein the coupling clip (13) has a threaded hole (19) for accommodating a suspension eye (20).

11. The pipe coupling according to claim 8, wherein the coupling clip (13) has a threaded hole (19) for accommodating a suspension eye (20).

12. The pipe coupling according to claim 1, wherein the coupling clip (13) has a threaded hole (19) for accommodating a suspension eye (20).

13. The pipe coupling according to claim 1, wherein the coupling clip (13) comprises a two-shell clip with a clamping lever (16).

14. A pipe coupling for connecting two pipe ends (1, 2) comprising two coupling parts implemented as a male part (3) and a female part (4) which are partially mated, at least one annular groove (10) having an inserted seal (11) being provided in the contact region on the outer side of the male part (3) and/or the inner side of the female part (4), and the male part (3) comprising an outer annular tab (6) and the female part (4) comprising a shoulder (7) enclosed by a coupling clip (13) in a form-fit manner when the pipe coupling is closed, wherein there is provided on the outer side of the female part (4) an annular groove (9) into which a guide tab (14) disposed on the inner side of the coupling clip (13) is inserted when the pipe coupling is closed, wherein the coupling clip (13) comprises a two-shell clip with a clamping lever (16).

15. The pipe coupling according to claim 14, the coupling clip (13) has a support (18) for the clamping lever (16).

16. The pipe coupling according to claim 14, wherein the coupling clip (13) has a threaded hole (19) for accommodating a suspension eye (20).

17. The pipe coupling according to claim 14, wherein the guide tab (14) is in the form of a substantially circumferential tab.

18. The pipe coupling according to claim 17, wherein the coupling clip (13) has a threaded hole (19) for accommodating a suspension eye (20).

19. The pipe coupling according to claim 17, wherein the coupling clip (13) has a threaded hole (19) for accommodating a suspension eye (20).

* * * * *